United States Patent

Finamore

[11] Patent Number: 5,404,399
[45] Date of Patent: Apr. 4, 1995

[54] TELEPHONE VISUAL SIGNALING DEVICE

[76] Inventor: Sandro Finamore, 1559 65th St., Brooklyn, N.Y. 11219

[21] Appl. No.: 959,422

[22] Filed: Oct. 13, 1992

[51] Int. Cl.$^6$ .................................................. H04M 1/00
[52] U.S. Cl. .................................... 379/376; 379/369; 379/373
[58] Field of Search ............. 379/353, 369, 373, 376, 379/375; 340/705; 353/122; 446/485, 219

[56] References Cited

U.S. PATENT DOCUMENTS

| 940,281 | 11/1909 | Roffy | 353/122 X |
|---|---|---|---|
| 4,491,695 | 1/1985 | Haskins | 379/369 |
| 4,747,133 | 5/1988 | Valenzona et al. | 379/376 |
| 4,982,424 | 1/1991 | Saito et al. | 379/376 |
| 5,118,319 | 6/1992 | Smith et al. | 446/219 |
| 5,214,457 | 5/1993 | Takanashi et al. | 353/122 X |

Primary Examiner—James L. Dwyer
Assistant Examiner—Paul A. Fournier
Attorney, Agent, or Firm—Michael I. Kroll

[57] ABSTRACT

A telephone visual signaling device is provided which consists of a telephone connected to an incoming signal line and a mechanism for producing an identifiable beam of light when the telephone receives a telephone call on the incoming signal line.

1 Claim, 2 Drawing Sheets

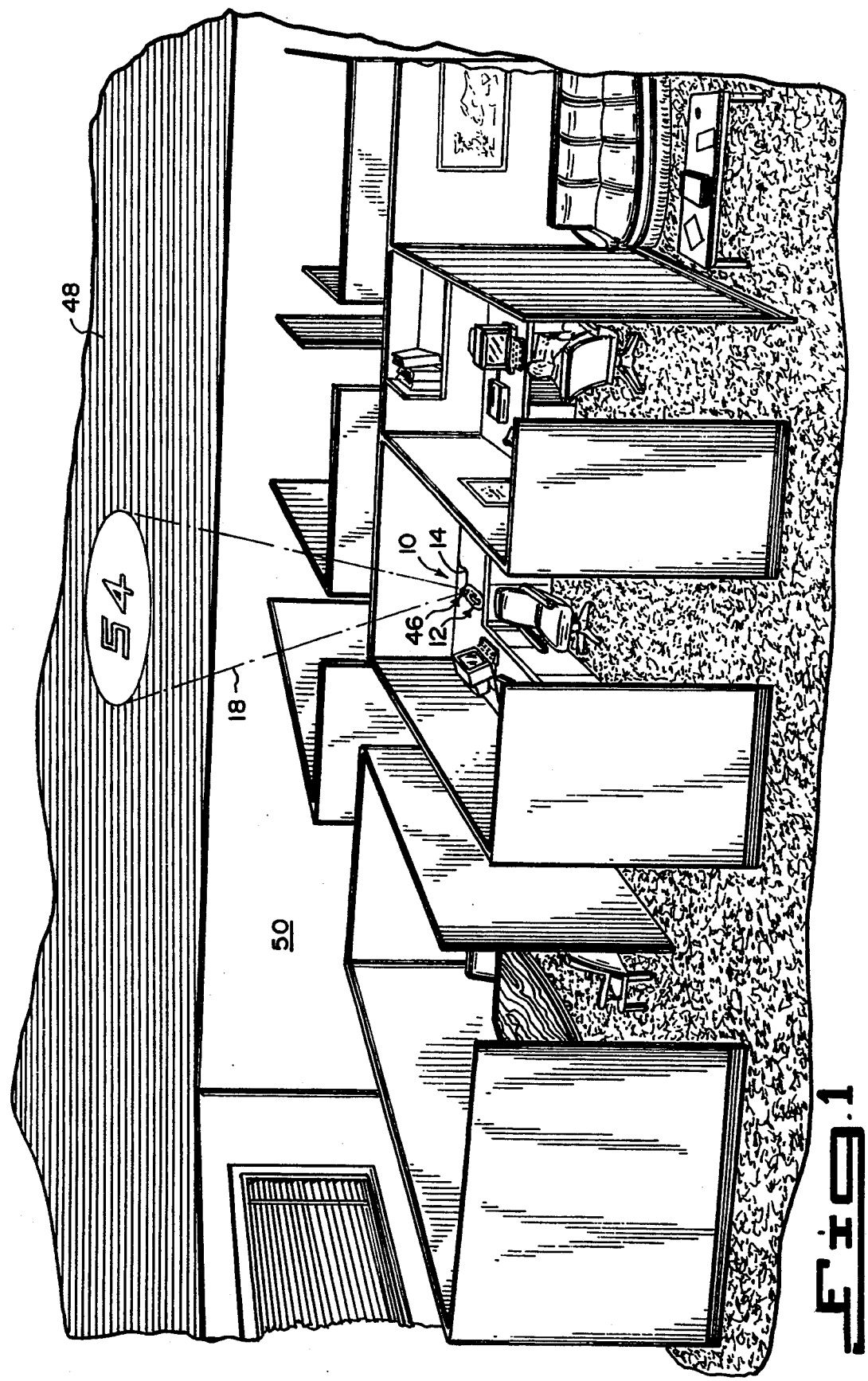

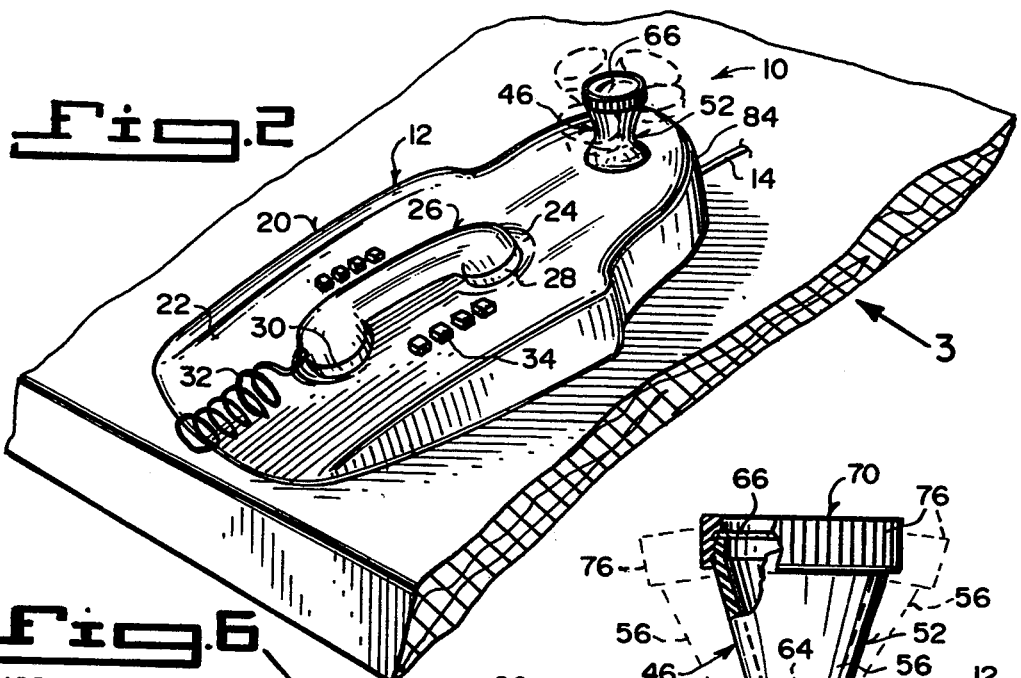
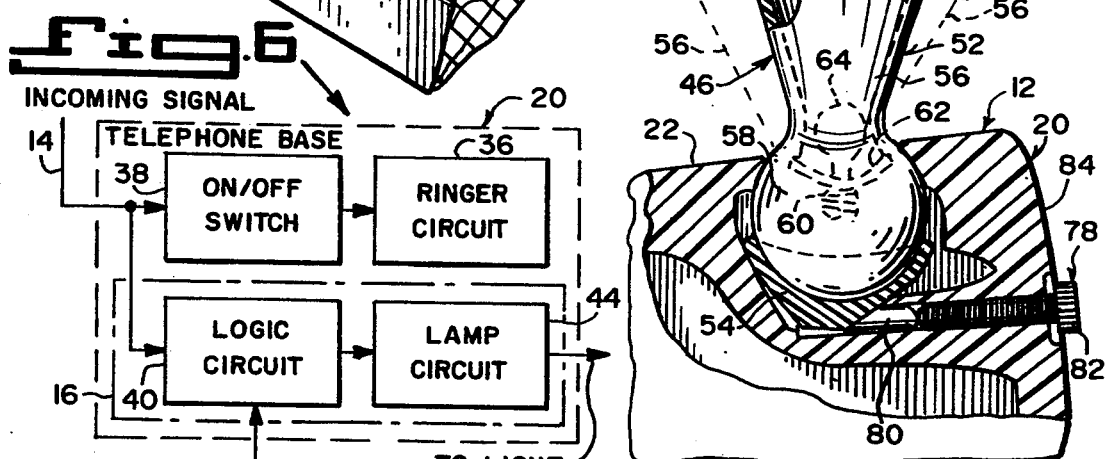
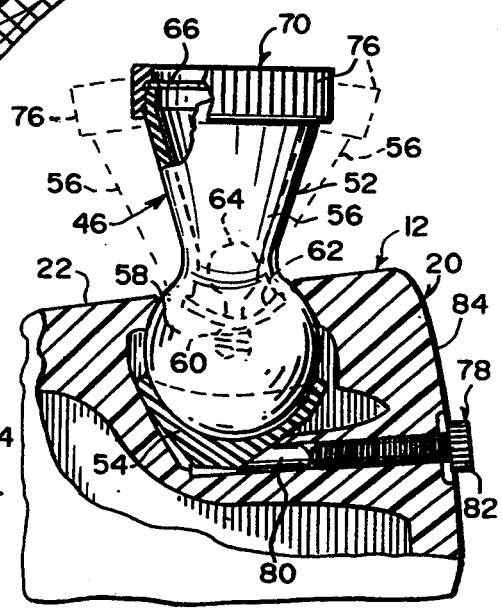
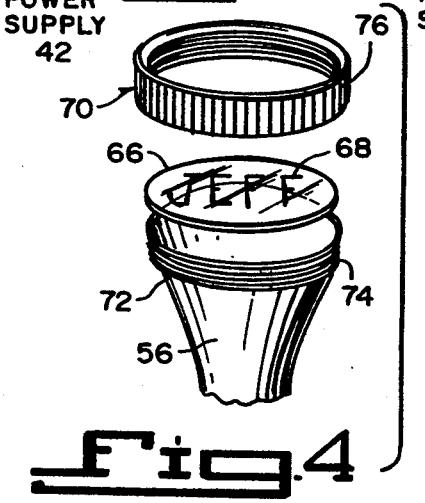

TELEPHONE VISUAL SIGNALING DEVICE

BACKGROUND OF THE INVENTION

1. Field of the Invention

The instant invention relates generally to communication calling systems and more specifically it relates to a telephone visual signaling device.

2. Description of the Prior Art

Numerous communication calling systems have been provided that are adapted to example U.S. Pat. Nos. 4,426,555 to Underkoffler; 4,578,542 to Alderman; 4,679,231 to Reichle; 4,707,855 to Pasinski et al; 4,747,133 to Valenzona et al; 4,800,438 to Yuter; 4,856,045 to Hoshina; 4,951,311 to Sterr; 4,953,205 to Yang; 5,012,507 to Leighton et al and 5,087,906 to Eaton et al. While these units may be suitable for the particular purpose to which they address, they would not be as suitable for the purposes of the present invention as heretofore described.

SUMMARY OF THE INVENTION

A first object of the present invention is to provide a telephone visual signaling device that will overcome the shortcomings of the prior art devices.

A second object is to provide a telephone visual signaling device that will project an identifiable beam of light from a telephone onto a ceiling to visually indicate to a person that an incoming telephone call is being received by the telephone.

A third object is to provide a telephone visual signaling device that will help the person locate the telephone which is receiving the incoming telephone call in a room containing many telephones.

A fourth object is to provide a telephone visual signaling device that can be used by a maitre d' at a busy restaurant, receiving incoming calls that cannot be heard, whereby a beam of light will reflect off a ceiling, with name of the restaurant to notify the maitre d' of the call.

A fifth object is to provide a telephone visual signaling device that can be used as an aid to the hearing impaired in which the device is connected to an amplifier.

A sixth object is to provide a telephone visual signaling device that can be used in a hospital at a nurses station to eliminate noise for comfort of patients, while the nurses could better hear calls of distress from the patients.

A seventh object is to provide a telephone visual signaling device that can be used as entertainment for a family in a home, whereby new visual messages can be changed for special occasions, such as weddings, birthdays, anniversaries, etc.

An eight object is to provide a telephone visual signaling device whereby a dual light beam can be used for a couple, such as his and her names in a heart on lenses, for projection in the dual light beams.

A ninth object is to provide a telephone visual signaling device that is simple and easy to use.

A tenth object is to provide a telephone visual signaling device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of an office with the instant invention in use projecting an identifiable beam of light onto the ceiling to visually indicate an incoming telephone call.

FIG. 2 is a perspective view of the instant invention per se placed upon a flat surface.

FIG. 3 is a view taken in direction of arrow 3 in FIG. 2 with parts broken away and in section showing the uniball sleeve assembly in greater detail.

FIG. 4 is an exploded perspective view of the upper portion of the uniball sleeve assembly showing the magnifying lens in greater detail.

FIG. 5 is a perspective view of a modification showing two uniball sleeve assemblies within the telephone.

FIG. 6 is a block diagram of the circuitry within the base of the telephone.

DETAILED DESCRIPTION OF THE PREFERRED EMBODIMENTS

Turning now descriptively to the drawings, in which similar reference characters denote similar elements throughout the several views, the Figures illustrate a telephone visual signaling device 10 which consists of a telephone 12 connected to an incoming signal line 14 and a mechanism 16 for producing an identifiable beam of light 18, when the telephone 12 receives a telephone call on the incoming signal line 14.

The telephone 12 includes a base 20 having an inclined top surface 22 with a cradle seat 24, in which the incoming signal line 14 is connected into the base 20. A handset 26 having an ear piece 28 and speaker 30 is removably positioned within the cradle seat 24 on the inclined top surface 22 of the base 20. A handset cord 32 extends between the base 20 and the handset 26. A keypad 34 is on the inclined top surface 22 on opposite sides of the cradle seat 24 on the base 20.

The telephone 12 further contains a ringer circuit 36 within the base 20 connected to the incoming signal line 14. The ringer circuit 36 will produce an audible signal when the telephone 12 receives the telephone call. An on/off switch 38 is connected between the ringer circuit 36 and the incoming signal line 14, so that a person can manually shut off and turn on the ringer circuit 36.

The identifiable light beam producing mechanism 16 includes a logic circuit 40 within the base 20 connected between the incoming signal line 14 and a remote power supply 42. A lamp circuit 44 is connected to the logic circuit 40. When the logic circuit 40 recognizes the telephone call from the incoming signal line 14 it will connect the remote power supply 42 to the lamp circuit 44 to activate the lamp circuit 44 to produce the identifiable light beam 18.

An apparatus 46 is for projecting the identifiable light beam 18 from the lamp circuit 44 onto a flat surface 48 such as a ceiling in an office 50 to visually indicate to a person that the telephone call is being received by the telephone 12. The identifiable light beam projecting apparatus 46 consists of a uniball sleeve assembly 52 projecting upwardly from the inclined top surface 22 of the base 20.

The uniball sleeve assembly 52 contains a socket member 54 carried within the base 20 below the inclined top surface 22. An inverted conical housing 56, having a bottom ball shaped projection 58 is provided. The bottom ball shaped projection 58 will ride within the socket member 54, so that the inverted conical housing 56 extending upwardly therefrom can be angularly adjusted.

A light socket 60 is mounted within the inverted conical housing 56 and is electrically connected to the lamp circuit 44. A reflector 62 is mounted within the inverted conical housing 56 about the light socket 60. A light bulb 64 is connected to the light socket 60.

A magnifying lens 66 is provided having identifying indicia 68 thereon. A structure 70 is for removably coupling the magnifying lens 66 to a wide top end 72 of the inverted conical housing 56. The removably coupling structure 70 contains an externally threaded neck 74 on the wide top end 72 of the inverted conical housing 56. An internally threaded collar 76 engages with the externally threaded neck 74 to hold the magnifying lens 66 in place. When the collar 76 is removed the magnifying lens 66 can replaced when needed.

A unit 78 is for retaining the inverted conical housing 56 in an angularly adjusted position. The retaining unit consists of a wedge 80 to bear against the socket member 54. A set screw 82 is threaded into a side 84 of the base 20, so as to press the wedge 80 against the socket member 54.

In FIG. 5 two identifiable light beam projecting apparatuses 46 are on the inclined top surface 22 of the base 20. This will allow two identifiable beams of light 18 to project upwardly therefrom onto the ceiling 48, so as to make various patterns.

The identifying indicia 68 on the magnifying lens 66 can typically be but not limited to names, numbers, pictures, cartoon characters, sports figures and similar symbols. The magnifying lens can also be made in different colors for identification and be of heat resistant material.

Other uses of the telephone visual signaling device 10 are as follows:

1. Used by a maitre d' at a busy restaurant, receiving incoming calls that cannot be heard, whereby a beam of light will reflect off a ceiling, with name of the restaurant to notify the maitre d' of the call.
2. Used as an aid to the hearing impaired in which the device 10 is connected to an amplifier.
3. Used in a hospital at a nurses station to eliminate noise for comfort of patients, while the nurses could better hear calls of distress from the patients.
4. Used as entertainment for a family in a home, whereby new visual messages can be changed for special occasions, such as weddings, birthdays, anniversaries, etc.
5. A dual light beam can be used for a couple, such as his and her names in a heart on the lenses for projection in the dual light beams.

LIST OF REFERENCE NUMBERS 10 telephone visual signaling device
12 telephone
14 incoming signal line
16 identifiable light beam producing mechanism
18 identifiable beam of light
20 base
22 inclined top surface of 20
24 cradle seat in 22
26 handset
28 ear piece of 26
30 speaker of 26
32 handset cord
34 keypad
36 ringer circuit
38 on/off switch
40 logic circuit
42 remote power supply
44 lamp circuit
46 identifiable light beam projecting apparatus
48 flat surface (ceiling)
50 office
52 uniball sleeve assembly for 46
54 socket member
56 inverted conical housing
58 bottom ball shaped projection on 56
60 light socket
62 reflector
64 light bulb
66 magnifying lens
68 identifying indicia on 66
70 removably coupling structure
72 wide top end of 56
74 externally threaded neck on 72
76 internally threaded collar
78 retaining unit
80 wedge
82 set screw
84 side of 20

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A telephone visual signaling device which comprises:
   a) a telephone connected to an incoming signal line including a base having an inclined top surface with a cradle seat, in which the incoming signal line is connected into said base, a handset having an ear piece and speaker removably positioned within the cradle seat on the inclined top surface of said base, a handset cord extending between said base and said handset, a keypad on the inclined top surface on opposite sides of the cradle seat on said base, a ringer circuit within said base connected to the incoming signal line, whereby said ringer circuit will produce an audible signal when said telephone receives the telephone call, and an on/off switch connected between said ringer cirthe incoming signal line, so that a person can manually shut off and turn on said ringer circuit:

b) means for producing an identifiable beam of light when said telephone receives a telephone call on the incoming signal line;

wherein said means for producing an identifiable beam of light includes:

a uniball sleeve assembly projecting upwardly from the inclined top surface of said base and including a socket member carried within said base below the inclined top surface and an inverted conical housing having a bottom ball shaped projection, in which the bottom ball shaped projection will ride within said socket member, so that said inverted conical housing extending upwardly therefrom can be angularly adjusted, the bottom ball shaped projection riding within said socket member, a magnifying lens having identifying indica thereon and means for removably coupling said magnifying lens to a wide top end of said inverted conical housing, said removably coupling means including an externally threaded neck on the wide top end of said inverted conical housing and an internally threaded collar to engage with said externally threaded neck to hold said magnifying lens in place, so that when said collar is removed said magnifying lens can be replaced when needed;

means for retaining said inverted conical housing in an angularly adjusted position comprising a wedge to bear against said socket member, and a set screw threaded into a side of said base, so as to press said wedge against said socket member;

a logic circuit having input connections to said incoming signal line and a remote power supply for connecting said power supply to an output connection thereof upon recognizing the telephone call from the incoming signal line, a lamp circuit connected to said output connection of said logic circuit for receiving power therefrom in response to said logic circuit recognizing the telephone call from the incoming signal line, thereby activating said lamp circuit and enabling said lamp circuit to produce the identifiable light beam; and means for projecting the identifiable light beam from said lamp circuit onto a flat surface to visually indicate to a person that the telephone call is being received by said telephone.

* * * * *